UNITED STATES PATENT OFFICE.

GEORGE C. LEWIS, OF NEW YORK, N. Y.

METHOD OF TREATING FINELY-SUBDIVIDED MATERIAL.

1,263,082.                    Specification of Letters Patent.    Patented Apr. 16, 1918.

No Drawing.              Application filed January 25, 1917.   Serial No. 144,337.

*To all whom it may concern:*

Be it known that I, GEORGE C. LEWIS, a subject of the King of England, and a resident of the city of New York, New Dorp, Staten Island, borough of Richmond, Richmond county, and State of New York, have invented certain new and useful Improvements in Methods of Treating Finely-Subdivided Material, of which the following is a specification.

My invention is a new and improved method of treating light flocculent or powdered material, or any substance in a fine state of subdivision so as to better adapt it for handling, shipment or storage, reduce the labor cost involved, and lessen the dusty character of the material.

By means of my invention, I am able to reduce a given mass of such material to a fraction of its former volume without mechanical pressure and without impairing its softness, working qualities or state of subdivision. As a result of the use of my improved process, I am able to reduce the size of the minute interstices or interstitial spaces between adjacent particles, flakes, crystals, or other units of the mass and bring said units of the mass closer together without altering their individual size or character, at least to any material or appreciable extent. These minute interstices are ordinarily filled with occluded gas or atmospheric air which gives to the material its distended or inflated condition and which cannot be satisfactorily removed, to reduce the size of said spaces by said mechanical operations as compression of the mass, or the subjecting of it to a partial vacuum.

In carrying out my process, I first displace the occluded atmospheric air or other gas by a liquid which will not act as a solvent for the mass being treated and will not act to chemically or mechanically change the particles themselves. This treatment may be brought about by thoroughly intermixing the liquid and material in any suitable manner and by means of any suitable mixing machine or by adding either the liquid or the solid to the other. The relative proportions of liquid and solid are preferably such as to form a paste or wet plastic mass although a larger quantity or proportion of liquid may be used if desired without detriment to the process. During the intermixing the liquid forces out and displaces the gas and by surface attraction, capillary attraction or other action, the particles of the mass are brought very much closer together or rearranged and shifted in position so that the interstitial spaces are of very much smaller magnitude when filled with such a liquid than when filled with gas.

After the gas has been expelled by the action of the liquid, I remove the liquid but without any material increase in the size of the interstitial spaces, and in some cases with a further drawing together of the particles and a further reduction of the volume of the total mass. This removal of the liquid may be accomplished by evaporation alone or accompanied by heating at a temperature below that which will in any way adversely or deleteriously affect the material by melting, decomposing, charring, or otherwise. The removal of some of the liquid and particularly at the beginning of the operation, may be secured or facilitated by the treatment of the mass to centrifugal action in a suitable centrifugal drier, strainer or separator. The liquid removing operation may be and preferably is continued until the mass regains its original dryness and is thus ready for shipment, storage or commercial purposes. The liquid removed by evaporation, or otherwise, may be collected or condensed and may be used over again in treating another mass of material.

I do not wish to be limited to any particular kind of apparatus and illustration appears to be unnecessary. The intermixing may be accomplished in any suitable mixing machine and the paste or semi-plastic mass may be carried by a conveyer or other mechanism to the drying chambers, or it may be forced through a flat nozzle into the form of ribbons arranged in rows on a drying tray. These are merely suggestions as to the apparatus which might be employed.

Due to the reduction in the volume resulting from the use of my improved process, a given mass of the material may be stored in a smaller space, shipped in a smaller and lighter container and handled more economically, particularly as to labor cost and as to the losses in the form of rising dust during the handling. The process may be used for treating a large number of different substances and I do not wish to be limited to any particular one.

Merely as an example of a material in connection with which my process may be used to great advantage, I may mention carbon black or lamp black. As these are practically insoluble, there is a great range of readily volatile liquids which may be used to displace the occluded gas and which will not affect the constituent particles of the mass. Preferably, a liquid is employed which, upon evaporation, leaves no sediment or residue, or at least no deleterious or objectionable residue. Distilled water, alcohol, ether, gasolene, or various other liquids are suitable, although if great purity of the product is not absolutely necessary, commercially pure water may be used instead of distilled or chemically pure water.

As a further important feature of my invention, I may utilize my process for not only reducing the amount of occluded gas, but at the same time to thoroughly intermix with the material other substances which may aid in reducing the dusty character and which are not inimical to, but useful in connection with the material in some product into which the material is to be finally incorporated.

For instance, if carbon black or lamp black is to be used in the manufacture of rubber, printing ink, or certain other products, suitable hydrocarbons, colloidal or oleaginous materials may be intermixed with the carbon black or lamp black at the same time the liquid is being intermixed to displace the occluded gas. In the manufacture of printing ink, resin oil is a useful ingredient and in some rubber formulæ, certain waxes, oils, etc., are used. In the latter instance, particularly, only small amounts of such hydrocarbons are permissible and difficulty is sometime encountered in getting them thoroughly intermixed and uniformly distributed in the carbon black.

In carrying out my improved process, I make an emulsion of these ingredients with a liquid if they are insoluble in that liquid or dissolve them in the liquid if they are soluble. A paste may be made using from four to five times the weight of liquid to the weight of powder and as the hydrocarbons or other substances are thoroughly intermixed with the liquid, they will thus become thoroughly intermixed with the powder. It may be then thoroughly dried to evaporate the liquid and the resulting mass will have the hydrocarbon or other material thoroughly incorporated in it and such material will aid in reducing, if not entirely destroying the dusty character of the powder and thus reduce, if not eliminate, the losses incurred by powder carried away by air currents during manufacturing processes. This effects not only a saving in the material but renders the air more healthful and gives greater ease of manipulation of the product as well as the lessened bulk.

If, in carrying out my improved process, it is desired to incorporate waxes, or gum resins, in magnesia or carbon black, I find that gasolene is a very satisfactory liquid as it is a solvent of the ordinary waxes and gum resins but does not affect the magnesia or carbon black.

Having thus described my invention, what I claim as new and desire to secure by Letters Patent is:

1. The process of treating flocculent or other finely subdivided material to reduce the volume of a given mass to facilitate handling, shipment or storage, which includes displacing the occluded gas in the interstitial spaces with a readily vaporizable liquid and then removing the liquid by evaporation.

2. A process of treating flocculent or other finely subdivided material to facilitate handling, shipment or storage, which includes displacing the occluded gas in interstitial spaces by mixing the material with a liquid which will not dissolve or chemically affect the material and which will form a paste therewith, and evaporating the liquid from said paste.

3. The process which includes forming an emulsion or solution of a small quantity of oily substance and a completely vaporizable liquid, forming a paste of said mixture, and a flocculent or other finely subdivided material, and then evaporating a liquid therefrom.

4. The process of preparing a composition including carbon black or lamp black for commercial use in printing ink, rubber, etc., which consists in making a solution or emulsion of an oleaginous substance in a liquid, mixing said liquid with the carbon black or lamp black and completely evaporating the liquid.

Signed at New York, in the county of New York, and State of New York, this 24th day of January, A. D. 1917.

GEORGE C. LEWIS.